United States Patent [19]

Rossman et al.

[11] 4,271,112

[45] Jun. 2, 1981

[54] PROCESS FOR THE MANUFACTURE OF ROTATIONALLY-SYMMETRICAL COMPONENTS FROM SHORT-FIBERED MOLDING MATERIAL

[75] Inventors: Axel Rossman, Karlsfeld; Herbert Zech, Neubiberg, both of Fed. Rep. of Germany

[73] Assignee: Motoren-und Turbinen-Union, Fed. Rep. of Germany

[21] Appl. No.: 50,539

[22] Filed: Jun. 21, 1979

[30] Foreign Application Priority Data

Jun. 24, 1978 [DE] Fed. Rep. of Germany ....... 2827829

[51] Int. Cl.³ .......................... D04H 1/74; B29J 1/02
[52] U.S. Cl. ...................................... 264/86; 264/108; 264/134; 264/258; 264/310
[58] Field of Search .................... 264/108, 86, 87, 517, 264/258, 136–137, 134, 310

[56] References Cited

U.S. PATENT DOCUMENTS

| | | | |
|---|---|---|---|
| 1,950,089 | 3/1934 | Morse | 264/87 |
| 2,596,364 | 5/1952 | Brennan | 264/517 |
| 2,993,235 | 7/1961 | Brown et al. | 264/108 |
| 3,617,437 | 11/1971 | Bagg et al. | 264/87 |
| 3,833,698 | 9/1974 | Wiltshire | 264/517 |

FOREIGN PATENT DOCUMENTS

2163799  8/1973  Fed. Rep. of Germany.

*Primary Examiner*—Jeffery R. Thurlow
*Attorney, Agent, or Firm*—Scully, Scott, Murphy & Presser

[57] ABSTRACT

Process for producing a high-strength, rotationally-symmetrical component by appending short fibers of glass, carbon or aramid in an organic solvent, and depositing the fiber material in a rotating sieve-like receptacle through a radially movable nozzle. The produced preform is impregnated with a matrix of resin and hardener and pressed into its final shape.

7 Claims, 3 Drawing Figures

PROCESS FOR THE MANUFACTURE OF ROTATIONALLY-SYMMETRICAL COMPONENTS FROM SHORT-FIBERED MOLDING MATERIAL

BACKGROUND OF THE INVENTION

1. Field of the Invention

The present invention relates to a process for the production of rotationally symmetrical high-strength components formed from short fibers suspended in a liquid. Short-fiber molded materials have been used for a lengthy period of time for the production of complexly shaped members by means of pressure dies. The breaking length, in effect the specific strength of these materials is, however, inadequate for utilization in extremely rapidly rotating components, such as the compressor wheels of gas turbines or turbochargers.

2. Discussion of the Prior Art

German Pat. No. 21 63 799 describes a process for the satisfactory production of oriented short-fiber mats possessing high strength. Molded components made from such mats preimpregnated with synthetic resin evidence quite high breaking lengths, namely up to 90% of those of wound members. In this process, the fibers which are washed out of a liquid consisting of resin, hardeners and solvents are poured onto a moving screen belt in a manner similar to the manufacture of paper whereby an orientation of the fibers is obtained through the movement of the belt and through the flow. These mats (prepregs) can then be cut into flat pieces which can then be so superimposed as to produce a laminated voluminous formable member. This member is then inserted within a molding die and therein compressed and hardened into a high-strength shaped member.

This process is disadvantageous in that the components are manufactured from a large number of individual layers of oriented fibrous material and in the symmetrical arrangement of these layers. Furthermore, rotationally symmetrical bodies can only be produced from many layers with their fibers arranged in a generally restricted acceptable manner. Particular difficulties are encountered in the selection of the correct volume and the distribution of the material in the case of a complexly shaped member such as, for instance, a compressor wheel with integral blading. Spirally or radially arranged layers are difficult, if not completely impossible, to produce by means of this process.

SUMMARY OF THE INVENTION

Accordingly, it is an object of the present invention to provide an economic manufacturing process for high-strength components of the above-mentioned type. The desired fiber positioning, particularly a spiral alignment of the fibers, and the desired laminar construction can be achieved without major difficulties.

The invention is also particularly applicable to the manufacture of a thick-walled preform member in which difficulties can be encountered during evaporation of the solvents.

BRIEF DESCRIPTION OF THE DRAWINGS

Reference may now be had to the present invention illustrated by the accompanying drawings, in which.

DETAILED DESCRIPTION

Figure 1:
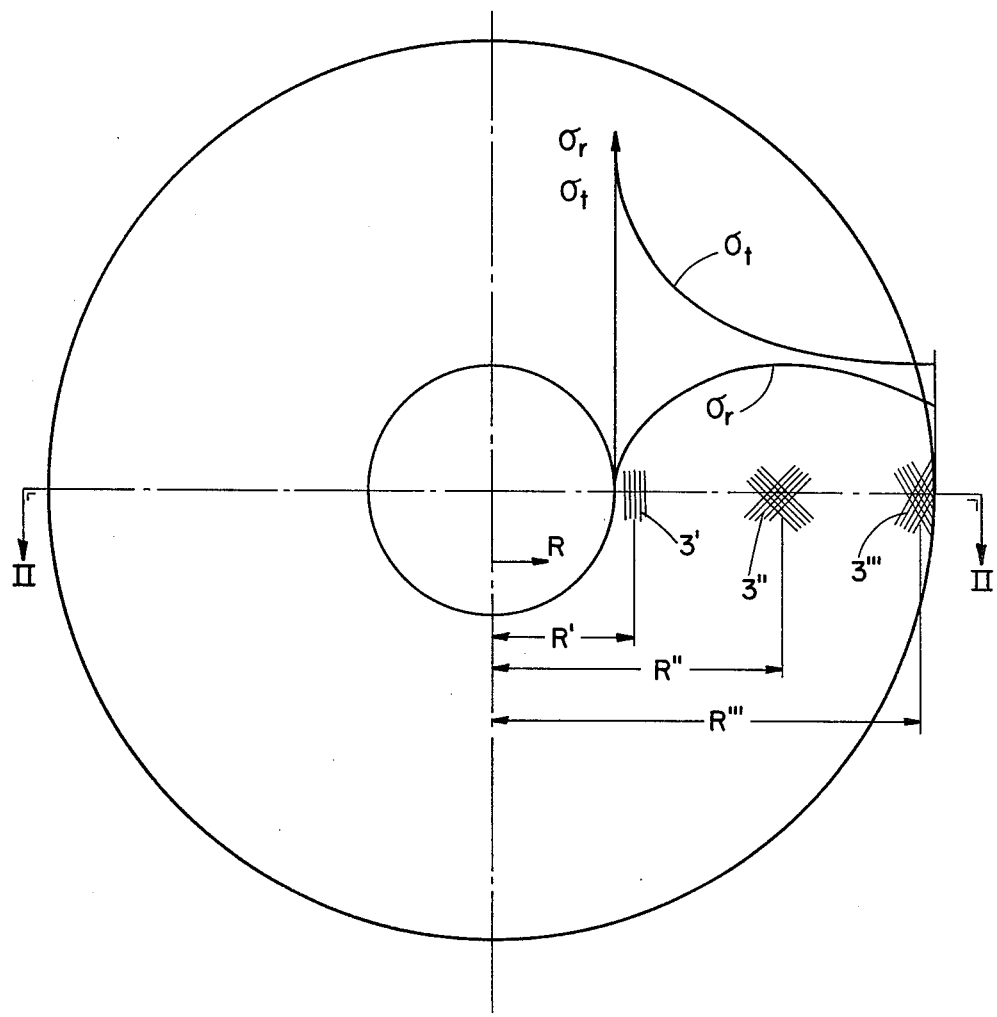
FIG. 1 shows a top plan view of a rotationally symmetrical body manufactured in accordance with the process of the present invention.
Figure 2:
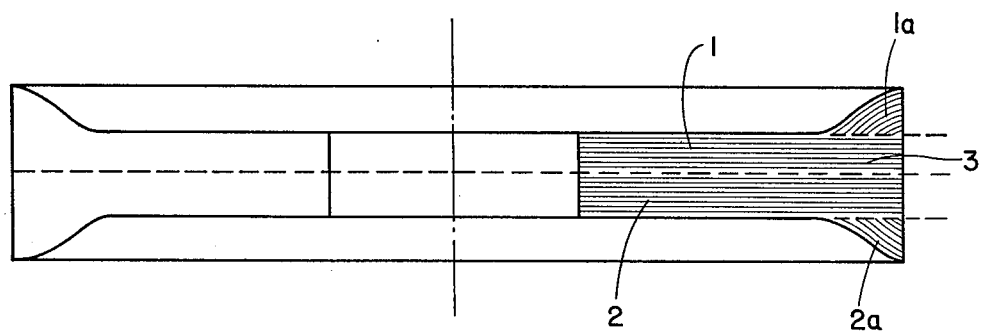
FIG. 2 shows a cross-section taken along line II—II in FIG. 1.

Referring in detail to FIGS. 1 and 2 of the drawings, a preform is provided from two assembled parts 1 and 2. Preferably, the parts are constituted from short fibers and suspended in and washed out of a liquid. The fibers may be glass fibers, carbon or graphite fibers, or aramid fibers of a length in the range of 1 to 30 mm.

The liquid is constituted of resin, hardeners and solvents. The matrix of resin and hardeners preferably consists of epoxy resin with anhydride- or acid- or amino hardeners, or of polyamide resins. The component of the resin-hardener admixture in the liquid should constitute about 10 to 40% by weight.

Solvents which are applicable are organic solvents, in particular chlorinated hydrocarbon materials.

The two parts of the member are mechanically interconnected, for example, by sewing. The circumference 1a, 2a is made heavier, for instance, so as to provide for the mounting of blades. In a single preform these heavier sections would not allow for the reliable manufacture with satisfactory fiber flow. As is shown, there can be obtained a quite favorable fiber flow 3.

The top plan view of such a preform, as illustrated in FIG. 1 indicates the varying fiber flow directions 3', 3'', 3''' in accordance with radii R', R'' or R'''. Thus, fiber flow and structure can be optimally adapted to the stress conditions occurring during operation. In addition, these stresses $\sigma_r$ and $\sigma_t$ are plotted in FIG. 1 for the various radii R.

Figure 3:
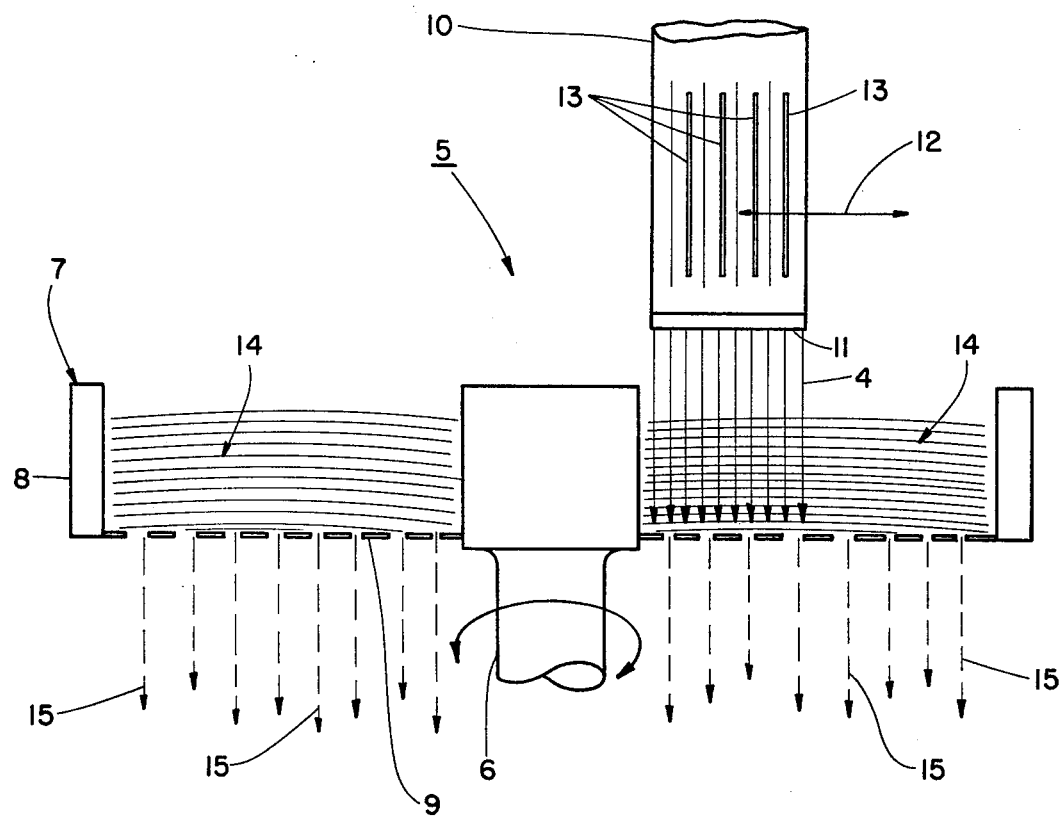
FIG. 3 shows a schematic representation of an installation for carrying out the inventive process.

Having reference to FIG. 3 of the drawings, schematically illustrated therein is an arrangement 5 for effectuating the process of the invention.

Thus, the arrangement 5 includes a vertically extending rotatable shaft 6 to the upper end of which there is fastened a basket-like strainer or sieve 7 having an imperforate annular side wall 8 and a horizontal sieve bottom 9.

A nozzle 10 with a bottom outlet 11 is mounted above the sieve 7 for to and fro axial movement in the direction of arrow 12 so as to cover essentially the radial extent of the sieve 7. Located within the nozzle 10 are a plurality of vertical guide plates 13 which orient the fibers moving downwardly out of the nozzle 10, the fibers being suspended in the liquid. During the radial movement of the nozzle 10, the fibers 4 are deposited in layers 14 in the sieve 7. The solvent 15 drips down through the apertures in the bottom 9 of the sieve 7 and is suitably aspirated.

In the hardening of the preform, the pressure employed in the process is at least 5 Kp/cm$^2$, and the temperature at least 80° C. However, the precise hardening parameters are dependent upon the resin-hardener admixture employed by the invention. The hardening is effected in a die (not shown) after impregnation of the preform with a resin-hardener matrix, with simultaneous hardening thereof under the above-mentioned conditions.

For the manufacture of thick-walled preforms it is also possible to employ a plurality of parts 1 and 2 produced by the inventive process. These parts can be superimposed, and thereafter interconnected three-dimensionally through sewing, for example, as in needlework.

What is claimed is:

1. In a process for the manufacture of predominantly rotationally-symmetrical components of high strength from short fibers which are suspended in a liquid, the improvement comprising:
   (a) forming said liquid from solvents,
   (b) producing a preform by feeding the suspended fiber material through a flat nozzle moving radially outwardly into a rotating rotationally-symmetrical container having a sieve wall, the inner shape of said container being similar to the final component shape but larger by the amount of volume reduction occurring during subsequent pressing,
   (c) producing a crosswise pattern of fibers by alternately moving the nozzle radially outwardly and inwardly including the step of producing layers of fiber with each layer having a desired fiber alignment with a desired fiber flow direction by selectively radially moving the nozzle relative to the rotating container such that the composite movements of the nozzle and the rotating container result in a desired fiber flow alignment in a fiber layer,
   (d) thereafter impregnating the preform with a resin-hardener matrix,
   (e) and pressing the preform into a final shape in a die while effecting simultaneous hardening thereof.

2. In a process for the manufacture of predominantly rotationally-symmetrical components of high strength from short fibers which are suspended in a liquid, the improvement comprising:
   (a) forming the liquid of resin, hardeners and solvents;
   (b) feeding suspended fiber material through a flat, radially outwardly directed nozzle into a rotating rotationally-symmetrical screen-walled container having an inner shape which is similar to the final component shape but larger by the amount of volume reduction occurring during subsequent pressing;
   (c) producing a crosswise pattern of fibers by alternately moving the nozzle radially outwardly and inwardly including the step of producing layers of fiber with each layer having a desired fiber alignment with a desired fiber flow direction by selectively radially moving the nozzle relative to the rotating container such that the composite movement of the nozzle and the rotating container result in a desired fiber flow alignment in a fiber layer;
   (d) imparting the final shape to the preform in a die with simultaneous hardening thereof.

3. Process as claimed in claim 1 or 2, wherein for the manufacture of thick-walled preforms, a plurality of preforms are superimposed upon each other and interconnected three-dimensionally by sewing.

4. Process as claimed in claim 1 or 2, said solvents being organic solvents.

5. Process as claimed in claim 4, said solvents being chlorinated hydrocarbon materials.

6. Process as claimed in claim 2, said resins and hardeners forming a matrix selected from the group consisting of epoxy resin and polyamide resin with anhydride, acidic or amino hardeners.

7. Process as claimed in claim 2, said resin-hardener admixture component constituting about 10 to 40% in said liquid.

* * * * *